UNITED STATES PATENT OFFICE.

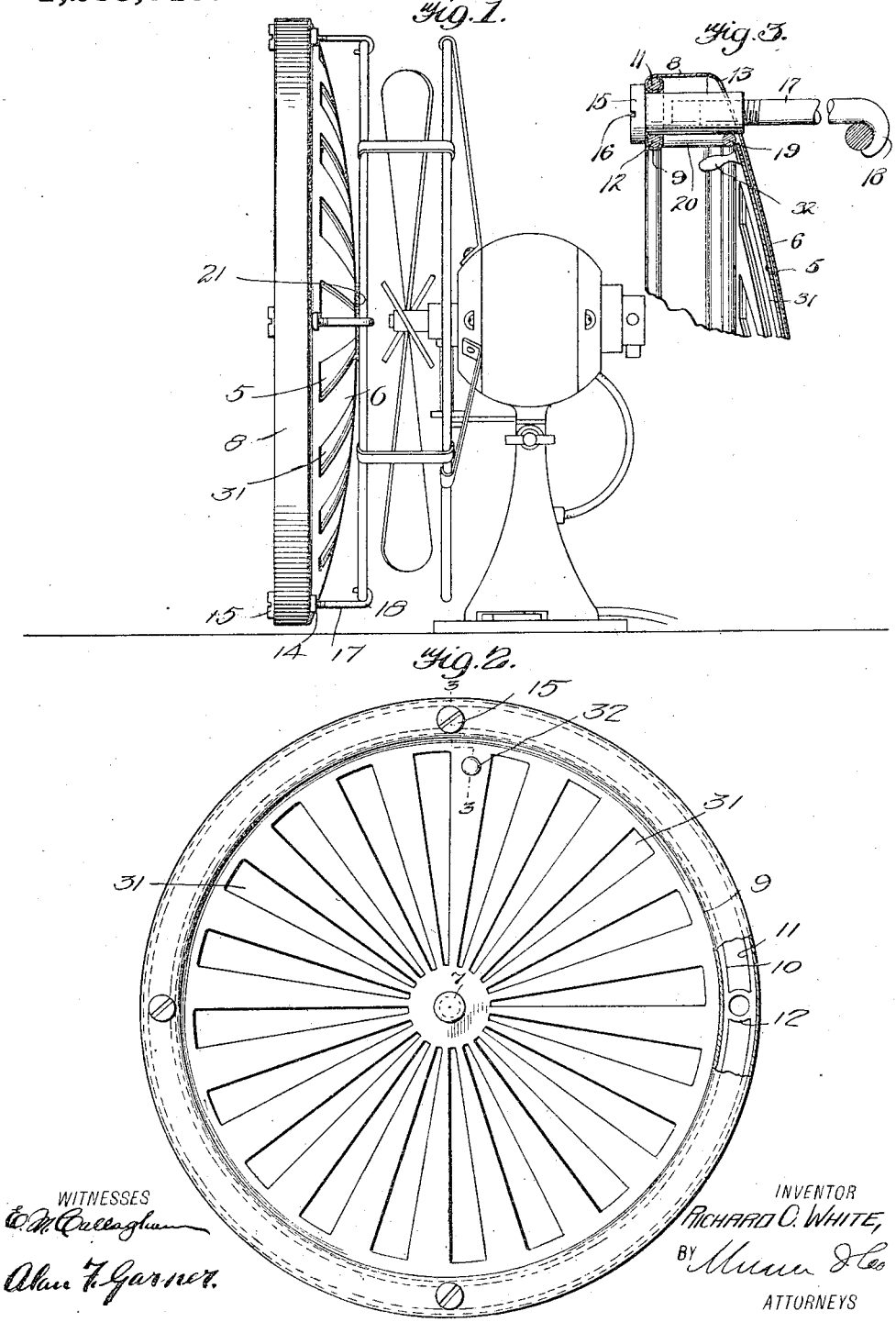

RICHARD CHRISTOPHER WHITE, OF JACKSONVILLE, FLORIDA.

DEFLECTOR FOR ELECTRIC FANS.

1,285,519.  Specification of Letters Patent.  Patented Nov. 19, 1918.

Application filed August 2, 1916. Serial No. 112,644.

*To all whom it may concern:*

Be it known that I, RICHARD C. WHITE, a citizen of the United States, residing at Jacksonville, in the county of Duval and State of Florida, have invented a new and useful Improvement in Deflectors for Electric Fans, of which the following is a specification.

This invention relates to an improved deflector or distributer for an electric fan.

The principal object of this invention is to provide a deflector or distributer which may be used in connection with electric fans of various types whereby the direct breezes created by the fans, and which are extremely objectionable, may be broken up and deflected, the result being that a greater area is cooled, and by broken or indirect air currents.

Another object of the invention is to provide a deflector capable of adjustment whereby the volume of the air currents may be regulated.

A further object is to provide a deflector having means of attachment to the guards of electric fans.

Still another object of the invention is to provide a deflector of the class described which will be extremely simple, durable, efficient in operation and inexpensive to manufacture, and which may be attached or detached from the fan guards of electric fans without the requirement of special tools or of skilled labor.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a side elevational view of a deflector constructed according to my invention, illustrating the same in position on an electric fan of a well known and ordinary type.

Fig. 2 represents a front view of the deflector, and

Fig. 3 represents a detail sectional view taken on the plane indicated by the line 3—3 of Fig. 2.

The deflector comprises a movable and a fixed concavo-convex disk 5 and 6 respectively. The disks are nested one within the other as indicated in the drawings, disk 5 being rotatably supported relatively to disk 6 by means of a stud or pivot pin 7. The deflector is adapted to be attached to the guard of a fan with the convex side directed toward said fan. The disk 6 is somewhat greater in diameter than disk 5, and at its margin is formed into a circumferential flange 8. This flange extends forwardly from the deflector and is turned inwardly at 9 over a wire frame work. The frame work constitutes an inner and outer wire ring 10 and 11 (see Fig. 2). The flange 8 is bent inwardly over these rings and is turned upon the inner ring 10 in order to maintain the frame work in place.

Rings 10 and 11 are connected at a plurality of equidistant points by the eyes 12 which may be brazed or otherwise suitably secured to the rings. At the points where the eyes are placed the flange is provided with openings in registration with the said eyes, and the disk 6 is provided with similar openings 13. Eyes 12 receive and act as bearings for internally threaded sleeves 14, which extend through the openings 13 of disk 6. The sleeves are provided with flanged heads 15 having screw-driver receiving slots 16 whereby the sleeves may be turned relatively to the deflector.

Threaded into the sleeves are the inner ends of bolts 17. The outer ends of the bolts are provided with hooks 18 adapted as indicated in Figs. 1 and 3 to engage the fan guard of an electric fan. By turning the sleeves the bolts may be tightened up or loosened as will be readily understood.

Disposed upon the disk 6 beneath ring 10 is a reinforcing ring 19, of a diameter substantially equal to that of ring 10. The reinforcing ring is connected to ring 10 at intervals, by braces 20 which are brazed or otherwise suitably secured to rings 10 and 19. The braces are preferably disposed at the points where the sleeves are carried by the deflector, so as to brace the bearings for said sleeves in order to prevent collapse of the flanged portion of the deflector.

In order to prevent rattling of the deflector while in place on the fan guard, there is provided a washer or bumper 21 secured to the convex side of the deflector, by means of the stud 7. The washer may be made of leather or other suitable material, and is adapted to rest against the center piece of the fan guard.

The disks 5 and 6 are provided with an equal number of radially disposed substantially triangular openings indicated at 31. The openings are arranged in spaced relation around the center of the disks. They may be triangular in shape as indicated, or may be of any other preferred formation. They are so arranged that by rotating disk 5 relative to disk 6 the openings in the disks may be brought into or moved out of registration with each other. When the openings are in registration the current of air created by the fan may in part pass through the deflector at the same time that it is spread by striking the convex face of the same. The current is thus broken up or diffused and its velocity retarded to a degree. An indirect or diffused rather than a direct breeze is thus obtained and at the same time the current is spread so that a greater area is cooled than would be were the deflector not utilized. By shifting the movable disk the size of the openings may be regulated, so that a larger or smaller volume of air may pass through the deflector. If so desired the disks may be moved so that the openings are entirely out of registration with each other, so that the column of air may be deflected radially from the fan as a center so as to practically shut off any direct contact of the current with the person using the deflector. On the other hand the openings may be positioned in full registration with each other whereby a greater amount of air may pass through the deflector and a less amount be radiated or spread thereby. In order that the movable disk may be readily shifted a handle 32 of suitable design is provided.

Such a deflector as I have provided may be used to equal advantage with ceiling fans or with the type known as "buzz" fans, and may be used to great advantage with the intake fans for public halls or other similar places. Any suitable material may be utilized in the construction of the deflector and attaching means. A light strong metal such as aluminum would probably be preferred. Although the two disks have been indicated in the drawings as being of the same thickness it might be found preferable to make one of them of heavier material than the other.

I claim:

1. A deflector comprising a pair of concavo-convex disks nested one within the other, a pivot pin connecting said disks at their centers, said deflector adapted to be positioned relatively to a fan with the convex side of the deflector directed toward said fan, an overhanging flange formed circumferentially of one of said disks and overhanging the other disk at the circumference of the latter in spaced relation to the same, a frame work carried by said overhanging flange, said frame work including an inner and an outer concentrically disposed spaced rings, eyes secured between said rings at equidistant points on said frame work, said flange provided with openings registering with said eyes, internally threaded sleeves disposed through said eyes and through openings in the disk on which said flange is formed, said sleeves provided with flanged heads, bolts having hooks at their outer ends adapted to engage the guard of the fan, said bolts at their inner ends being threaded into said sleeves, said disks provided with a plurality of openings adapted to be brought into or moved out of registration with each other as one of said disks is moved relatively to the other.

2. A deflector comprising a stationary and a movable concavo-convex disk nested one within the other, means for concentrically journaling said disks relatively to each other, said stationary disk provided with an overhanging flange, a frame work supported by said flange, eyes carried by said frame work, internally threaded sleeves journaled in said eyes and extended through said openings in the stationary disk, means adapted to co-act with said sleeves for securing the deflector to the guard of an electric fan, a reinforcing ring disposed upon said stationary disk, braces connecting said frame work with said reinforcing ring, said disks provided with openings adapted to be brought into and moved out of registration with each other by adjustment of said movable disk.

3. A deflector comprising a stationary and movable concavo-convex disk nested one within the other, means for journaling the movable disk relatively to the stationary disk, an overhanging flange provided on the stationary disk, means for strengthening said flange, means supported partially by said flange and partially by said stationary disk for connecting said deflector to the guard of a fan, said disks provided with openings adapted to be brought into and moved out of registration with each other by adjustment of the movable disk.

RICHARD CHRISTOPHER WHITE.

Witnesses:
W. T. HADLOW,
JOHN D. BISCHOFF.

Copies of this patent may be obtained for five cents each, by addressing the "Commissioner of Patents, Washington, D. C."